United States Patent [19]
Langner et al.

[11] Patent Number: 5,801,617
[45] Date of Patent: Sep. 1, 1998

[54] DEVICE FOR DETERRING TAMPERING OF ANTI-THEFT EQUIPMENT, METHOD FOR DETERRING TAMPERING OF ANTI-THEFT EQUIPMENT

[75] Inventors: Richard F. Langner; Thomas P. Smith; Malcolm W. Sherman, all of Scottsdale, Ariz.

[73] Assignee: Air Taser, Inc., Scottsdale, Ariz.

[21] Appl. No.: 779,112

[22] Filed: Jan. 6, 1997

[51] Int. Cl.$^6$ .................................................. G08B 13/14
[52] U.S. Cl. ........................... 340/426; 340/571; 340/691
[58] Field of Search .................................. 340/426, 571, 340/691

[56] References Cited

U.S. PATENT DOCUMENTS

| | | | |
|---|---|---|---|
| 550,229 | 11/1895 | McDonald | 340/427 |
| 2,057,138 | 10/1936 | Dowell | 340/426 |
| 2,164,076 | 6/1939 | Osgood | 340/426 |
| 4,843,371 | 6/1989 | Kuei et al. | 340/539 |
| 4,908,606 | 3/1990 | Kevonian | 340/571 |
| 5,258,741 | 11/1993 | Fuller | 340/426 |
| 5,515,032 | 5/1996 | Johnson | 340/571 |

*Primary Examiner*—Edward Lefkowitz
*Attorney, Agent, or Firm*—Cherskov & Flaynik

[57] ABSTRACT

A method and device for preventing the tampering of anti-theft devices is provided comprising a technique for electrifying the surface of the anti-theft device so as to visually and physically deter tampering of the anti-theft device. The invented method also provides a technique for marking an unauthorized person who attempts to tamper with the device.

18 Claims, 2 Drawing Sheets

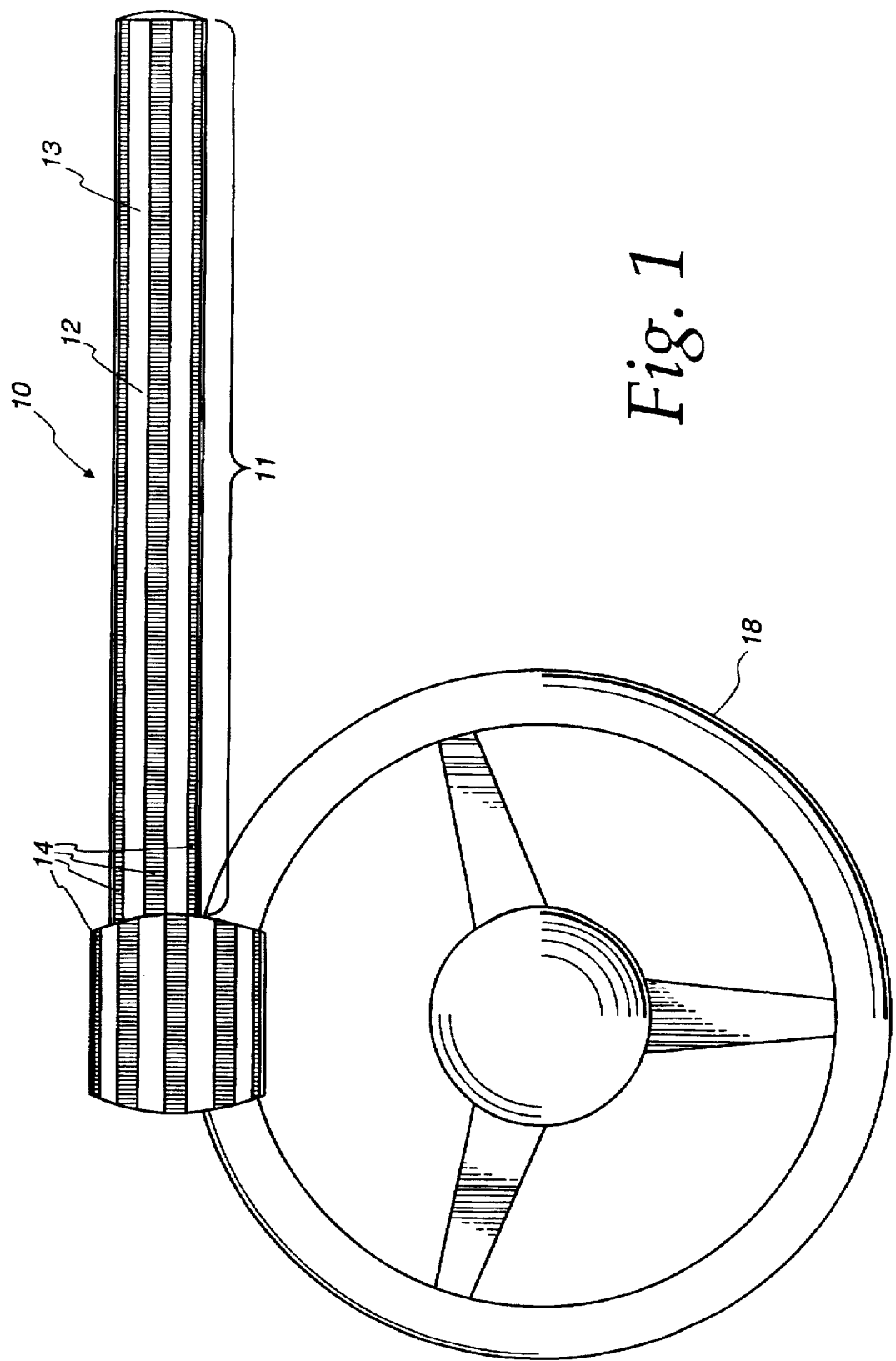

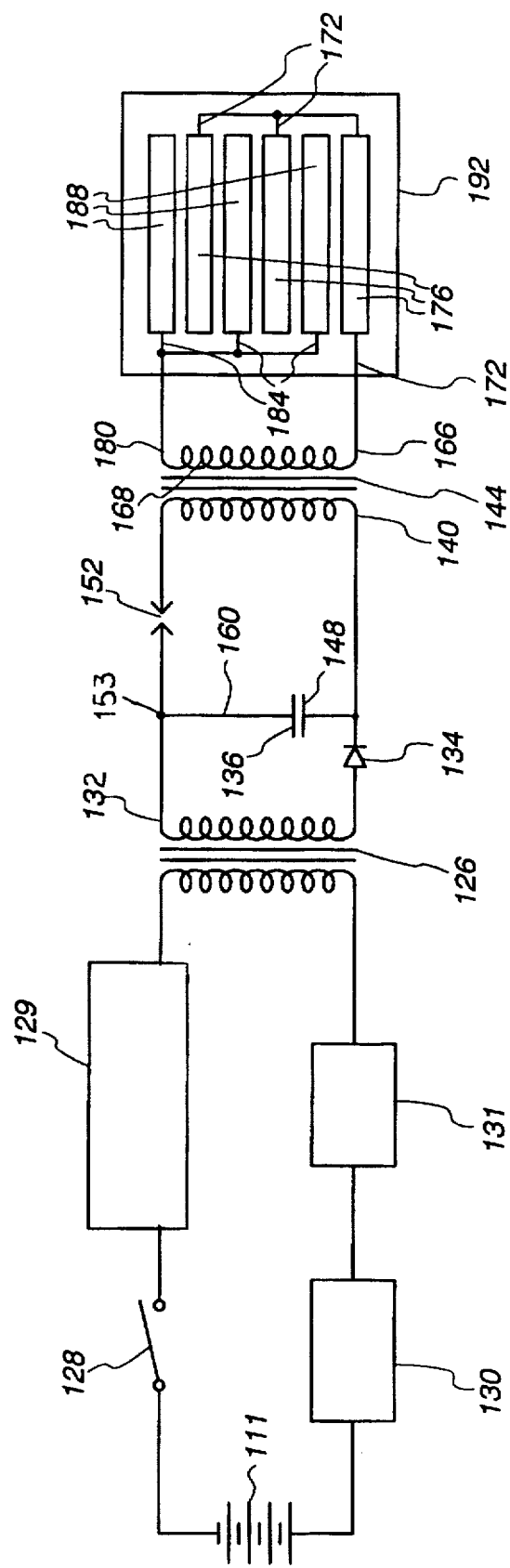

DEVICE FOR DETERRING TAMPERING OF ANTI-THEFT EQUIPMENT, METHOD FOR DETERRING TAMPERING OF ANTI-THEFT EQUIPMENT

BACKGROUND OF THE INVENTION

1. Field of the Invention

The present invention relates to electric discharge anti-theft protective devices and more particularly to electric discharge anti-theft devices for vehicles and other non-stationary machinery.

2. Background of the Invention

Car theft has been a very serious problem for decades. For many individuals, their car is their most valuable asset. For many others, it is second only to their residence. Thus several methods and devices for preventing car theft have been introduced. These methods include audio alarm systems, flashing lights, sensors that generate a radio alarm signal broadcast to a remote location such as a police station, devices that lock the steering wheel or some other vital component of the vehicle so that the latter becomes inoperable, devices that deliver an electric shock to anyone touching a critical component of the vehicle's exterior, among others.

For example, U.S. Pat. Nos. 2,186,597 and 3,722,788 respectively, disclose a means for electrifying the running boards and window sills of automobiles.

Another device, disclosed in U.S. Pat. No. 5,055,823, depicts an automobile anti-theft device that emits noise or light when tampered with.

Many of these devices can be activated accidentally when no theft is being attempted, such as when audio alarms are set off by rain, inadvertent touching of the car, or the effect of distant sources of sound such as thunder, detonation, and construction activity. As such, most onlookers pay no attention when an audio alarm is set off. Electrified external car body parts often impart shocks to passers-by brushing against the car.

Lastly, many anti-theft devices can be tampered with so that, given enough time, a skilled car thief can overcome any obstacle he can get his hands on and steal the car in the end. The thief has no fear of his personal safety while tampering with the anti-theft device and thus is less discouraged from attempting to remove the device. The same considerations apply to anti-theft devices installed on a variety of assets such as works of art, documents, and stationary objects.

There is a need in the art to provide additional protection to existing anti-theft devices by preventing tampering with those devices. Such protection should be adequate to unequivocally deter tamperers without imparting permanent paralysis or injury to the tamperer. The supplemental anti-theft protection device may also provide a means for identifying the tamperer.

SUMMARY OF THE INVENTION

It is an object of the present invention to provide a method and device for preventing tampering with an anti-theft device or from maintaining contact with an asset that overcomes many of the disadvantages of the prior art.

A principal object of the present invention is to provide a method and a device to prevent unauthorized persons from tampering with an anti-theft device or from maintaining contact with the anti-theft device. A feature of the present invention is incorporating a non-lethal high voltage pulse to an unauthorized person touching the anti-theft device. An advantage of the invention is that the person receiving that impulse must cease contact with the anti-theft device. An additional advantage of the invention is that it can be used on existing anti-theft devices to provide an additional level of protection.

Still a further object of the present invention is to use a readily available power source to deliver the electric power required for the voltage pulse. A feature of the present invention is that it uses a commonly available battery such as a car battery. An advantage of the invention is that the method and device can be used in conjunction with a wide variety of objects or vehicles.

Yet another object of the present invention is to provide a sturdy low cost device for delivering a high voltage but non-lethal pulse. A feature of the present invention is that it uses standard readily available electronic components. An advantage of this feature is that the device can be manufactured at low cost and can be relied upon to perform as designed.

Another object of the present invention is to provide protection for a wide variety of objects. A feature of the present invention is that it can be made available in the form of sheeting that can be easily cut. An advantage of this feature is that the device can be made to fit arbitrarily shaped objects.

Still another object of the present invention is to provide protection for a wide variety of already existing objects or vehicles. A feature of the present invention is that it can be installed on the outside of an object. An advantage of this feature is that the method and device can provide additional protection at low cost to already manufactured objects and vehicles.

A further object of the present invention is to provide protection for several components of a given asset or vehicle. A feature of the present invention is that several high voltage protective electrodes can be connected in parallel to a pulse source. An advantage of the present invention is that a single high voltage source may be used to deliver a pulse at several locations.

Briefly, the invention provides a device for deterring theft of an asset comprising a means for visually deterring contact with the asset by an unauthorized person; a means for imparting an electric high voltage pulse to said person, wherein said electric high voltage pulse means operates in conjunction with the visually deterring means; and a means for preventing operation of the asset wherein said prevention means embodies said visual deterring means and said electric high voltage pulse means.

The invention also provides a method for deterring tampering with an anti-theft device comprising selecting an anti-theft device that is integral to an asset and encapsulating the anti-theft device with a means for preventing unauthorized circumvention of the anti-theft device, whereby the prevention means further comprises a means for visually deterring contact with the anti-theft device and a means for imparting an electric pulse to an unauthorized person.

BRIEF DESCRIPTION OF THE DRAWINGS

FIG. 1 illustrates the use of an exemplary device with an already available anti-theft device, in accordance with the features of the present invention; and FIG. 2 shows a schematic circuit diagram used in conjunction with the present invention.

DETAILED DESCRIPTION OF THE INVENTION

Generally, the invention provides a device and a method for augmenting the protection provided by typical anti-theft equipment. The invention deters tampering with such devices as locks, steering wheels, and access control devices by first visually deterring vandals, and then physically discouraging further tampering in instances where visual deterrence alone does not stymie persistent tamperers.

An exemplary device is depicted in FIG. 1, designated generally as numeral 10. Briefly, the device 10 provides further protection to an already existing anti-theft instrument 11, such as a steering wheel locking device. One such locking device is known as "The Club®." Other devices could be ignition lock housings, key holes, gear-shift actuators, break or accelerator pedals, fuel door locks, and interlock braking configurations.

An encapsulating region 12 of the device 10 is used to isolate the anti-theft instrument 11. The encapsulating region 12 is designed to virtually completely exclude access to the anti-theft instrument 11. In the depicted device 10, the encapsulating region 12 comprises a surface 13 overlaid with electrodes 14 spaced apart a predetermined distance.

The electrodes 14 are energized with an amount of electrical energy to sufficiently visually and/or physically deter tamperers from removing the device 10 from the anti-theft instrument 11. Such an electrode carrying surface 12 could be formed into a container adapted to receive the anti-theft instrument 11. In the depicted device 10, the electrode-carrying surface 12 is cylindrical or tubular in shape adapted to receive an already existing steering-wheel rotation-limiter. In another configuration, the electrode-carrying surface 12 could be a flexible sheet within which to encapsulate a steering wheel 18.

As noted supra, the electrodes 14 are energized with high voltage with which to visually and/or physically deter tampering of the anti-theft instrument 11. A standard power source coupled with an arcing and shocking circuit provides this electrical energy.

FIG. 2 provides a schematic representation of an exemplary embodiment of the electrical pulse power supply designated generally as numeral 100. The device comprises a first step-up transformer 126 with a 200-to-one ratio and a second step-up transformer 144 with a 20-to-one ratio. As shown in FIG. 2, the DC voltage provided by a battery 111, is converted to pulsed DC by the transformer 126.

The device is activated by a switch 128 that is controlled by a key or by remote control. Also connected in series with the switch 128 are a power supply controller 129, a sensor 130, and an alarm 131.

The secondary winding 132 of the transformer 126 steps up the voltage to 2,000 volts and is connected in series with a rectifier diode 134. The secondary winding 132 is also connected in parallel with a 0.22 microfarad capacitor 136 and the primary winding 140 of the second step-up transformer 144. The diode 134 renders the terminal 148 of the capacitor 136 positive. A spark-gap 152 is connected in series between a node 153 and the primary winding 140 of the second step-up transformer 144. The spark-gap 152 is utilized to regulate the voltage impressed across the primary winding of the second transformer 144. The positive terminal 166 of the secondary winding 168 of the transformer 144 is connected by electrical conducting means 172, such as wires, to a plurality of positive electrodes 176. Similarly the negative terminal 180 of the secondary winding 168 is connected by similar electrical conducting means 184 to a plurality of negative electrodes 188. The positive electrodes 176 and the negative electrodes 188 are embedded in alternation in a non-conducting substrate 192, analogous to the electrode containing surface 12 discussed supra.

While FIGS. 1 and 2 depict rectilinear electrodes, other shapes are suitable so long as they provide for an appropriate gap between adjacent electrodes. One may enhance the visual deterrence function of the electrodes by shaping the electrodes to spell out a message, (e.g. "HIGH VOLTAGE") or to depict a logo, a spark, and the like.

As an alternative embodiment to the depicted circuit 100, one may replace the step up transformer 144 with a series of step up transformers connected so that the secondary of a given transformer is connected to the primary of the succeeding transformer. The diode-capacitor-spark gap network is connected to the primary of the last transformer. Similarly the capacitor 136 may be replaced by a plurality of capacitors connected in parallel. The diode 134 may be replaced by a plurality of diodes connected in any of several conventional rectifier circuits in such a manner that the terminal 148 of the capacitor is maintained at a positive voltage.

Operation Detail

Ordinarily, the circuit is in an "inert" state. Either manually or by remote control, the switch 128 is activated when the invention is desired to be put in operation. The system is then put into a "wait" state which activates the sensor 130. The sensor may be a heat, pressure, magnetic field, or other sensing device that would detect the presence of an intruder. When such an intruder is detected, the alarm 131 is activated and a light flashing signal and/or a loud siren blast are emitted.

The power supply controller 129 is activated a predetermined time later (e.g. 3–5 seconds later). The power supply controller 129 generates an approximately 2 ampere half sinusoidal AC waveform which powers the primary winding of the first step up transformer 126. The first step up transformer 126 charges the capacitor 136 to approximately 2,000 volts. The capacitor 136 discharges through the spark gap 152 into the primary winding 140 of the second step up transformer 144 which outputs approximately 40,000 volts across the electrodes 176 and 188. This electrification results in arcing between oppositely charged electrodes. The power supply controller 129 controls the sequence sensor-alarm-electric arc activation and the duration of the electric arcing. Presently, a 3–5 second duration is employed.

The energy, approximately 0.5 Joules, and the voltage, 40,000 volts, of the discharge across the electrodes will force an intruder to withdraw his hand immediately but no injury will be inflicted. This device can deliver approximately 10 to 20 discharges per second. Electrical energy levels selected from between approximately 0.1 and 5 Joules impart no long-lasting detrimental injury to the tamperer.

Electrode Detail

The electrodes are embedded in the non-conducting substrate 192. The spacing 196 between the tips of oppositely charged electrodes depends on the voltage emitted therefrom. Generally, electrode spacings of between approximately 0.02 inches and 4 inches are suitable. Preferably, spacings of 0.5 inches to 1.5 inches are used.

The electrodes may be of arbitrary dimensions provided they are adapted to be received by the intended supporting substrates. Any good electrical conductor is suitable for the electrodes Suitable materials include but are not limited to copper, aluminum, brass, iron, steel, and bronze.

The electrodes may be affixed to the substrate by a variety of means, including but not limited to spray-deposition, adhesion, mechanical fasteners such as bolts, etc. A variety of non-conducting materials are suitable for the substrate 192. These include but are not limited to glass, resin, rubber, plastics, Mylar®, coated metal, among others.

The primary requirement of the electrode containing substrate is that the breakdown electric field exceeds 40,000 V/mm. The substrate 192 may be either rigid or flexible and can be made of arbitrary thickness. One may manufacture sheets of the electrode/substrate combination together with connecting wires and these sheets may then be cut to cover desired areas. Connections between wires and electrodes may be effected by any suitable splicing means, including, but not limited to, soldering and crimping.

FIG. 1 illustrates how the present invention is installed on a specific steering wheel locking device. The substrate 192 may be affixed permanently by means of a suitable adhesive or bolted down to the locking device. In the alternative, it may be affixed removably by means of a strap, or Velcro, or a clamp.

The electric pulse supply (not shown) and the audio alarm (not shown) may be mounted separately and then connected to the substrate. Similarly, one may affix the substrate to any other component of the vehicle or asset to be protected, or one may choose to provide such protection to several components. The electrode wires can then be connected to a single pulse power supply and audio alarm. The electrode/substrate are also used to protect the wires, power supply, and audio alarm.

The pattern of electrodes is easily recognizable from some distance and this would visually deter a would-be thief. In addition one may affix a suitable warning of the presence of high voltage.

To facilitate identification of an unauthorized person tampering with the invented device, a means for identifying the person may be integrated in the electrode carrying substrate region of the device. Such an identification means could include a powder or dye which discharges outwardly toward the region of first contact so as to leave a mark or pattern on the skin or clothing of the intruder. Such a pattern could mimic the electrode pattern, such as the rectilinear design depicted in FIG. 1, or even a logo design in which the electrodes are configured. In this instance, a powder could coat the electrodes and be discharged outwardly upon electrode contact by an intruder.

Furthermore, the present invention may be used to protect a variety of assets including but not limited to motor vehicles, (such as farm or construction equipment, automobiles, and motorcycles), objects on display, safes, and doors.

While the invention has been described with reference to details of the illustrated embodiment, these details are not intended to limit the scope of the invention as defined in the appended claims.

The embodiment of the invention in which an exclusive property or privilege is claimed is defined as follows:

1. A device for deterring tampering of an anti-theft instrument comprising:
   a.) a means for generating an electric arc upon a surface of said anti-theft instrument wherein said electric arc generating means comprises a surface with at least a pair of alternately charged electrodes, wherein the electric arc acts as a visual deterrent to an unauthorized person;
   b.) a means for imparting an electric pulse to the person contacting said anti-theft instrument, wherein said electric pulse imparting means operates in conjunction with said electric arc generating means; and
   c.) a means for containing said electric arc generating means and said electric pulse imparting means within said anti-theft instrument.

2. The device as recited in claim 1 wherein said electrodes are longitudinally parallel to each other.

3. The device as recited in claim 1 wherein said electric pulse is communicated to the unauthorized person when the unauthorized person contacts said surface.

4. The device as recited in claim 1 wherein the generated electric arc occurs between adjacent electrodes when a specified condition is met.

5. The device as recited in claim 1 further comprising a means for identifying the unauthorized person.

6. The device as recited in claim 5 wherein said identifying means is a marker imparted to the person.

7. The device as recited in claim 6 wherein said marker is a dye.

8. The device as recited in claim 1 wherein said electric arc generating means and said electric pulse imparting means include an electric circuit comprising:
   a.) a voltage source;
   b.) means for stepping up said voltage to a magnitude capable of delivering a non-injuring electric voltage pulse;
   c.) means for limiting electrical voltage to a predetermined maximum; and
   d.) means for imparting said stepped up voltage to the unauthorized person tampering with the anti-theft instrument.

9. The device as recited in claim 8 wherein said voltage source is initially DC.

10. The device as recited in claim 1 wherein said electric pulse has a voltage selected from a range of between approximately 1,000 V and 100,000 V.

11. The device as recited in claim 1 wherein said electric arc generating means further comprises a plurality pairs of alternately charged electrodes.

12. A method for deterring tampering with an anti-theft device comprising:
   a.) generating an electric arc upon a surface of said device wherein said step of generating an electric arc generating means comprises a surface with at least a pair of alternately charged electrodes, wherein the electric arc acts as a visual deterrent to an unauthorized person;
   b.) imparting an electric pulse to an unauthorized person from a means for imparting an electric pulse; and
   c.) containing said electric generating means and said electric pulse imparting means within the anti-theft device.

13. The method as recited in claim 12 wherein the electric pulse is communicated to the unauthorized person when the unauthorized person contacts the surface of the anti-theft device.

14. The method as recited in claim 12 wherein said electric arc generating means and said electric pulse imparting means include a voltage circuit comprising:
   a.) a voltage source;
   b.) means for stepping-up said voltage to a magnitude capable of delivering a non-injuring electric voltage pulse; and
   c.) means for supplying said stepped-up voltage to at lease one pair of electrodes so as to facilitate electric arcing between the electrodes and also to facilitate delivery of said non-injuring electric voltage pulse to the unauthorized person when the person contacts the electrodes.

15. The method as recited in claim 14 wherein the non-injuring electric voltage is between approximately 1,000 and 100,000 volts.

16. A device for deterring tampering of an anti-theft instrument comprising:

a) a means for generating an electric arc upon a surface of said anti-theft instrument prior to an unauthorized person contacting the instrument; wherein said electric arc generating means comprises a surface with at least a pair of alternately charged electrodes, wherein the electric arc acts as a visual deterrent to an unauthorized person;

b) a means for imparting electric energy to the person contacting said anti-theft instrument, wherein said electric energy imparting means operates in conjunction with said electric arc generating means; and c) a means for containing said electric arc generating means and said electric energy imparting means within said anti-theft instrument.

17. The device as recited in claim 16 wherein said electric arc generating means further comprises a plurality of pairs of alternately charged electrodes.

18. The device as recited in claim 17 wherein the electrodes are longitudinally parallel to each other.

* * * * *